(12) United States Patent
Kozlovski (10) Patent No.: US 11,738,510 B2
(45) Date of Patent: Aug. 29, 2023

(54) BIOPRINTER PRINT HEAD

(71) Applicants: MEATECH 3D, LTD., Rehovot (IL); THE IP LAW FIRM OF GUY LEVI, LLC, Wyckoff, NJ (US)

(72) Inventor: Dan Kozlovski, Rehovot (IL)

(73) Assignee: Steakholder Foods, LTD., Rehovot (IL)

( * ) Notice: Subject to any disclaimer, the term of this patent is extended or adjusted under 35 U.S.C. 154(b) by 0 days.

(21) Appl. No.: 17/914,890

(22) PCT Filed: Mar. 5, 2021

(86) PCT No.: PCT/US2021/021254
§ 371 (c)(1),
(2) Date: Sep. 27, 2022

(87) PCT Pub. No.: WO2021/178928
PCT Pub. Date: Sep. 10, 2021

(65) Prior Publication Data
US 2023/0118248 A1    Apr. 20, 2023

Related U.S. Application Data (60) Provisional application No. 62/985,463, filed on Mar. 5, 2020.

(51) Int. Cl.
*B29C 64/209*    (2017.01)
*B33Y 30/00*    (2015.01)
*A23P 20/20*    (2016.01)
*B29C 64/112*    (2017.01)
*A23P 20/25*    (2016.01)
*B33Y 70/00*    (2020.01)

(52) U.S. Cl.
CPC ............ *B29C 64/209* (2017.08); *A23P 20/20* (2016.08); *B29C 64/112* (2017.08); *B33Y 30/00* (2014.12); *B33Y 70/00* (2014.12); *A23P 2020/253* (2016.08)

(58) Field of Classification Search
CPC ..... B29C 64/209; B29C 64/112; B33Y 30/00; B33Y 70/00; A23P 20/20; A23P 2020/253
See application file for complete search history.

(56) References Cited

U.S. PATENT DOCUMENTS

| | | |
|---|---|---|
| 2016/0288414 A1 | 10/2016 | Ozbolat et al. |
| 2018/0243478 A1 | 8/2018 | Pang et al. |
| 2019/0375163 A1 | 12/2019 | Sterna et al. |

*Primary Examiner* — Joseph S Del Sole
*Assistant Examiner* — Mohamed K Ahmed Ali
(74) *Attorney, Agent, or Firm* — Guy Levi; The IP Law Firm of Guy Levi, LLC (57) ABSTRACT

The disclosure relates to print heads for use in the bioprinting of biostructures having predetermined two (2D)- and/or three dimensional (3D) pattern of cells. Specifically, the disclosure relates to print heads operable in a bioprinting systems for the fabrication of edible biostructures using drop-on-demand.

15 Claims, 6 Drawing Sheets

BIOPRINTER PRINT HEAD

BACKGROUND

The disclosure is directed to print heads for use in the bioprinting of biostructures having predetermined two (2D)- and/or three dimensional (3D) pattern of cells. Specifically, the disclosure is directed to print heads operable in a bioprinting systems for the fabrication of edible biostructures using drop-on-demand.

Three-dimensional (3D) bioprinting refers to a printing process in which patterns of biological materials such as cells are deposited using three-dimensional printing technologies in such a way that functions of the bioprinted components are preserved. Some of the technologies that are used for 3D bioprinting of cells are photolithography, magnetic bioprinting, stereolithography, and direct cell extrusion. Once printed, the bioprinted pre-tissue is transferred to an incubator and the cell-based pre-tissue matures into a tissue. The biological material (e.g. cells), however, is typically impregnated within a hydrogel which helps to support and/or promote tissue growth. A hydrogel is a liquid that becomes a gelatinous solid when exposed to a curing agent. Curing agents can include UV light, cross-linking polymers, or chemicals such as calcium chloride.

It is difficult to print biological materials with hydrogels with specificity and precision due to the mixing effects between the curing agent and the biological materials. In addition, the timing of the mixing poses a substantial problem in standard bioprinting, as curing effects are time dependent as well, meaning the mixing profile becomes a limiting factor, of $j^{th}$ en with few potential optimization points. In addition, the printing process itself can be inefficient.

Therefore, the need exists for print heads dedicated to the use in the bioprinting of precision-fabricated biostructures, such as skeletal muscles to be used as edible protein sources.

SUMMARY

Disclosed, in various implementations, are print heads for use in bioprinting systems of biostructures having predetermined two (2D)- and/or three dimensional (3D) pattern of cells. Specifically, the disclosure is directed to a print head operable in a bioprinting systems for the fabrication of edible biostructures using drop-on-demand.

In an exemplary implementation provided herein is modular bioprinter print head comprising: a quadrilateral orifice plate, having an apical surface, a basal surface, a pair of opposing bored side walls, and a first side wall defining a groove opposing a second side wall defining a groove; a plurality of bio ink dispensing elements arranged in an array, each dispensing element having a basal surface with an inlet conduit and an outlet conduit, the basal surface of the dispensing element abutting the apical surface of the orifice plate, wherein dispensing element operable to deliver the bio ink; a first bio ink circulating manifold, and a second bio ink circulating manifold each defining a longitudinal axis $X_l$, having a bored side wall parallel with the longitudinal axis Xl, and an opposing solid wall, and a pair of opposing side walls disposed transverse to the longitudinal axis, each first and second recirculating manifold maintaining further fluid communication with each dispensing element, wherein the first and second circulating manifold are configured to circulate the bio ink through each dispensing element and further being in fluid communication with a bio ink reservoir.

BRIEF DESCRIPTION OF THE FIGURES

For a better understanding of the print heads operable in a bioprinting systems for the fabrication of edible non-random biostructures using drop-on-demand, with regard to the exemplary implementations thereof, reference is made to the accompanying examples and figures, in which:

FIG. 5A, illustrates another example of a single dispensing element, disposed on a theoretical orifice plate having a single dispensing nozzle, provided to illustrate flow through the dispensing element, with FIGS. 5B, and 5C providing a cutaway views thereof.

DETAILED DESCRIPTION

Provided herein are exemplary implementations of print heads for use in the bioprinting of biostructures having predetermined two (2D)- and/or three dimensional (3D) pattern of cells. Specifically, the disclosure is directed to print heads operable in a bioprinting systems for the fabrication of edible biostructures using drop-on-demand.

In an exemplary implementation, provided herein is a modular bioprinter print head comprising: a quadrilateral orifice plate, having an apical surface, a basal surface, a pair of opposing bored side walls, and a first side wall defining a groove opposing a second side wall defining a groove; a plurality of bio ink dispensing elements arranged in an array, each dispensing element having a basal surface with an inlet conduit and an outlet conduit, the basal surface of the dispensing element abutting the apical surface of the orifice plate, wherein dispensing element operable to deliver the bio ink; a first bio ink circulating manifold, and a second bio ink circulating manifold each defining a longitudinal axis $X_l$, having a bored side wall parallel with the longitudinal axis Xl, and an opposing solid wall, and a pair of opposing side walls disposed transverse to the longitudinal axis, each first and second recirculating manifold maintaining further fluid communication with each dispensing element, wherein the first and second circulating manifold are configured to circulate the bio ink through each dispensing element and further being in fluid communication with a bio ink reservoir.

A more complete understanding of the print heads operable in a bioprinting systems for the fabrication of edible biostructures using drop-on-demand disclosed herein can be obtained by reference to the accompanying drawings. These figures (also referred to herein as "FIG.") are merely schematic representations based on convenience and the ease of demonstrating examples of the present disclosure, and are, therefore, not intended to indicate relative size and dimensions of the devices or components thereof, their relative size relationship and/or to define or limit the scope of the exemplary exemplary implementations illustrating them. Although specific terms are used in the following description for the sake of clarity, these terms are intended to refer only to the particular structure of the exemplary implementations selected for illustration in the drawings, and are not intended to define or limit the scope of the disclosure. In the drawings and the following description below, it is to be understood that like numeric designations refer to components of like function.

Likewise, cross sections are referred to on normal orthogonal coordinate system having XYZ axis, such that Y axis refers to front-to-back, X axis refers to side-to-side, and Z axis refers to up-and-down.

Figure 1:
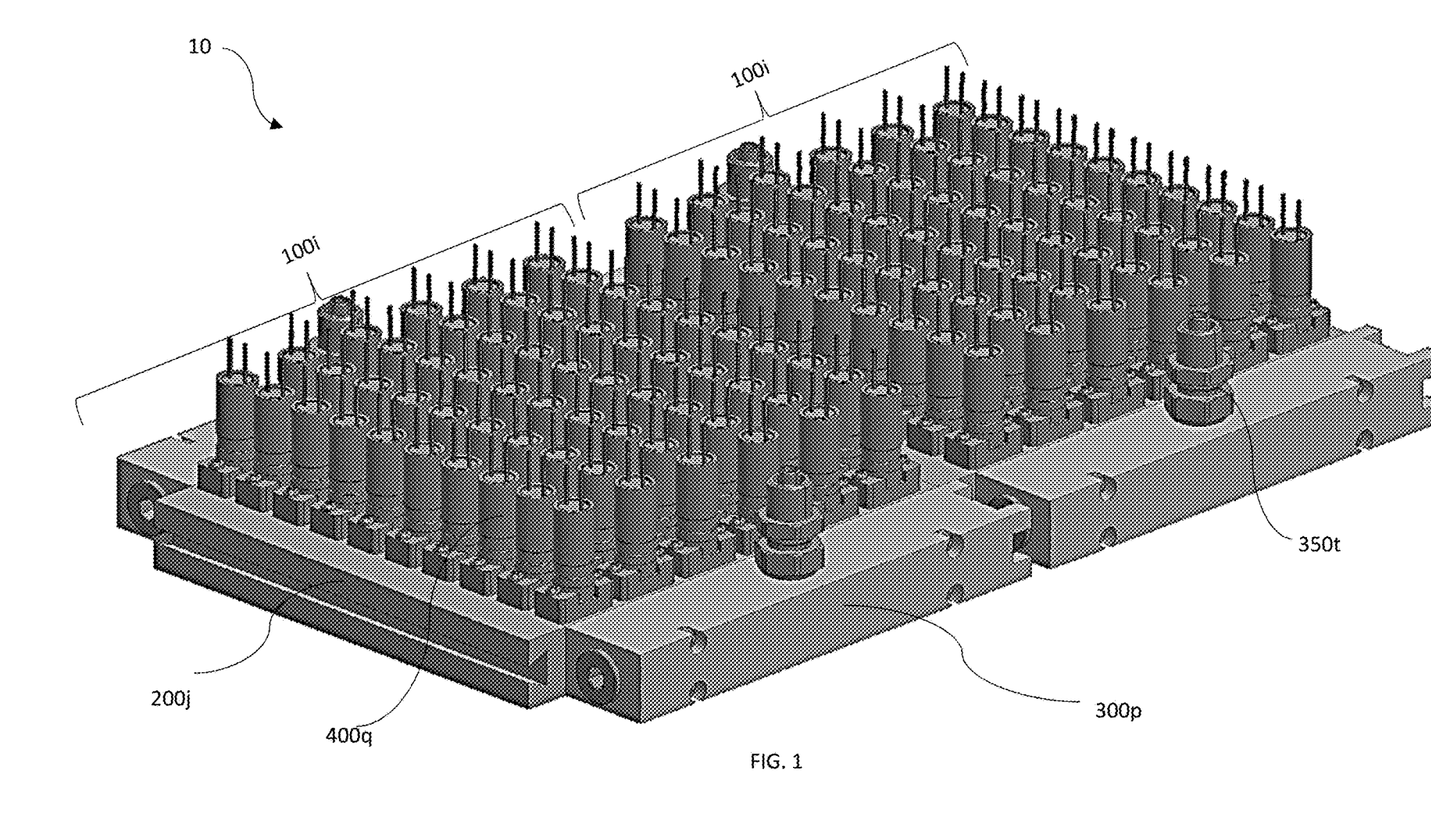
FIG. 1, illustrates an exemplary implementation of print head group comprising two print heads.
Figure 2A:
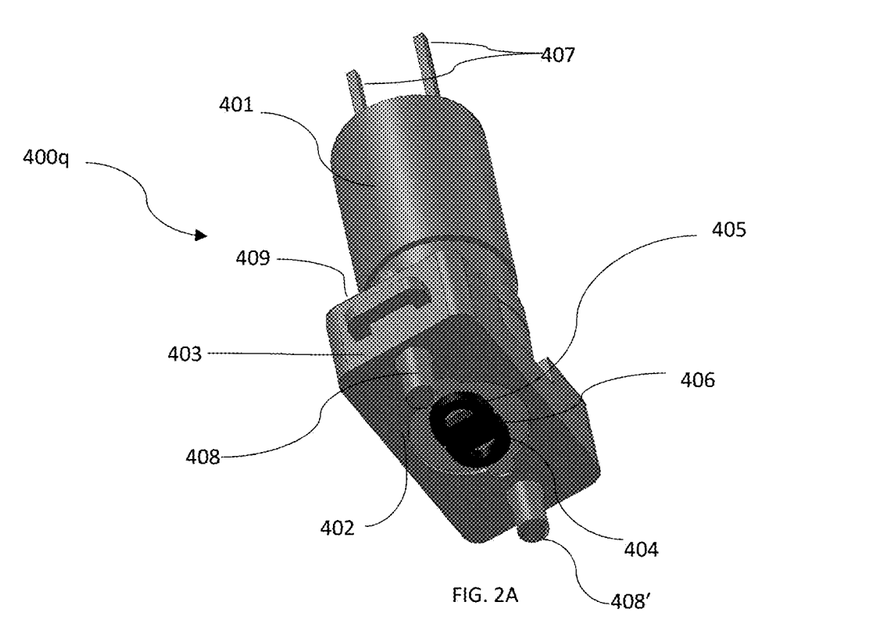
FIG. 2A, illustrates a single dispensing element, with FIG. 2B illustrating a Y-Z cutaway of FIG. 2A.
Figure 2B:
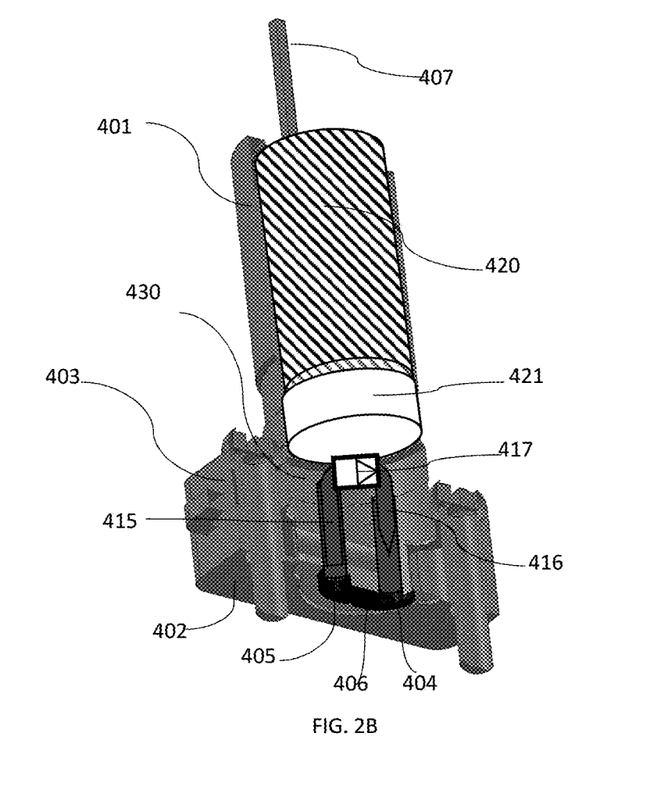
Figure 3A:
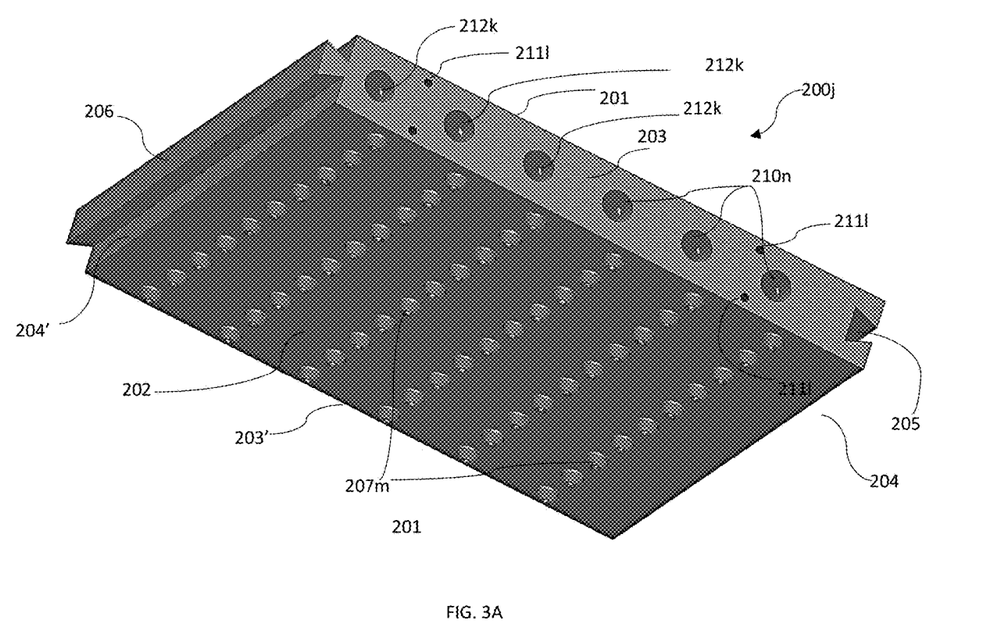
FIG. 3A, illustrates a bottom perspective of the orifice plate of the print head illustrated in FIG. 1, with FIG. 3B illustrating a X-Z cross section of the orifice plate illustrated in FIG. 3A.

Turning now to FIG. 1-6, illustrating modular bioprinter print head 100$i$ comprising: a quadrilateral orifice plate 200$j$, having an apical surface 201, a basal surface 202, a pair of opposing bored side walls 203, 203', and a first side wall 204 defining a groove 205 opposing a second side wall 204' defining a tongue 206 (see e.g., FIG. 3A). Also illustrated are plurality of bio ink dispensing elements 400$q$, arranged in an array (see e.g., FIGS. 1, 6), each q$^{th}$ dispensing element having basal surface 402 with inlet conduit 405 and an outlet conduit 404, basal surface 403 of dispensing element 400$q$ (see e.g., FIGS. 2A-2B) abutting a designated area on apical surface 201 of orifice plate 200$j$, wherein each q$^{th}$ dispensing element 400$q$ operable to deliver bio ink (see e.g., bio ink reservoir 500, FIG. 4A). FIGS. 1, 4A, 4B, and 6 also illustrate first and second bio ink circulating manifold 300$p$, each defining a longitudinal axis $X_l$ (see e.g., FIG. 4A) having bored side wall 306 parallel with longitudinal axis $X_l$, and opposing solid wall 307, and pair of opposing side walls 304, 304' disposed transverse to longitudinal axis $X_l$, each p$^{th}$ circulating manifold 300$p$ maintaining further fluid communication with q$^{th}$ dispensing element 400$q$, wherein the first and second circulating manifold are configured to circulate bio ink 501 through each q$^{th}$ dispensing element 400$q$, and further being in fluid communication with bio ink reservoir 500 (see e.g., FIG. 4A)

In the context of the disclosure, the term "modular" with respect to modular bioprinter print head 100$i$ refers in an exemplary implementation to a self-contained unit that comprises substantially all components required to generate the drop-on-demand of the bio-ink composition. The modular or self-contained nature of modular bioprinter print head 100$i$ allows variety, interchangeability and flexibility in use, and permits system 10 to be used with a variety of different configurations and mounted in different positions.

Furthermore, in the context of the disclosure, the term "operable" means the system and/or the device and/or the program, or a certain element or step is fully functional, sized, adapted and calibrated, comprises elements for, has the functional interface, whether electric, mechanical, or chemical, and meets applicable operability requirements to perform a recited function when activated, coupled, implemented, actuated, effected, realized, contacted, or when an executable program is executed by at least one processor associated with the system and/or the device. In relation to systems and circuits, the term "operable" means the system and/or the circuit is fully functional and calibrated, comprises logic for, having the hardware and firmware necessary, as well as the circuitry for, and meets applicable operability requirements to perform a recited function when executed by at least one processor.

Figure 3B:
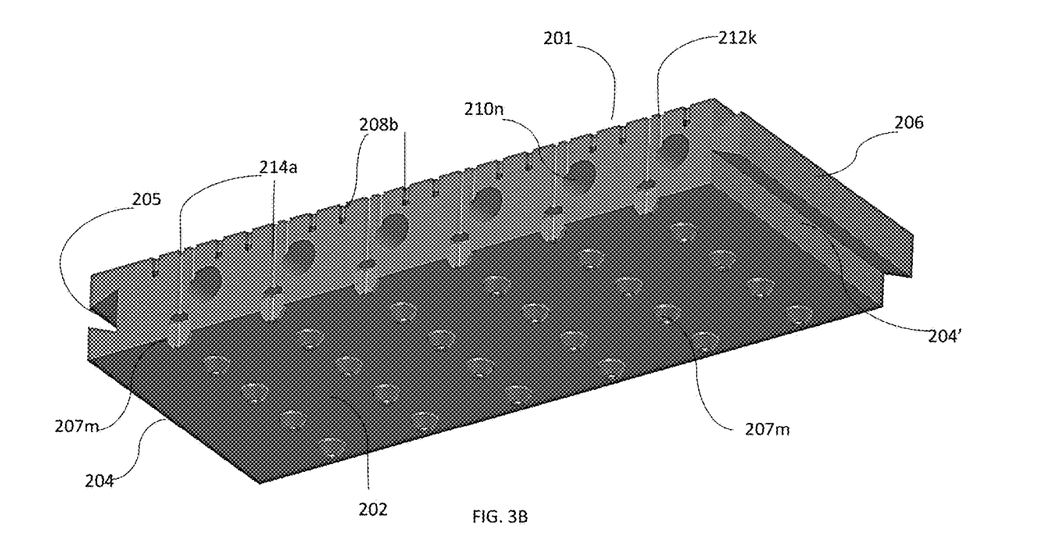

Turning momentarily to FIGS. 3A, 3B, illustrating an example implementation of quadrilateral orifice plate 200$j$, whereby quadrilateral orifice plate 200$j$ further defines plurality of conduits 210$n$ spanning the width of quadrilateral orifice plate 200$j$ between bored side walls 203, 203', each n$^{th}$ conduit 210$n$ sized and configured to maintain liquid communication with the first and second bio ink circulating manifold 300$p$. In other word, each n$^{th}$ conduit 210$n$ is configured to align and sealingly couple with corresponding bore 310$n$ in p$^{th}$ circulating manifold 300$p$ (see e.g., FIG. 4A).

As illustrated in FIG. 3B each j$^{th}$ orifice plate 200$j$, further defines plurality of parallel tube pairs, each pair comprised of dispensing tube 214$a$ and an adjacent charging tube 212$k$ wherein each a$^{th}$ dispensing tube 214$a$ having a first opening at apical surface 201 of j$^{th}$ orifice plate 200$j$, and a second opening at basal surface 202 of j$^{th}$ orifice plate 200$j$, the apical opening of a$^{th}$ dispensing tube 214$a$, sized and configured to operably couple to, and maintain liquid communication with q$^{th}$ dispensing element's 400$q$, outlet conduit 404 (See e.g., FIG. 2B). Likewise, as illustrated in FIG. 3B, each k$^{th}$ charging tube 212$k$ (referring to the tube receiving bio-ink 501 from recirculating manifold 300$p$) having a first opening at apical surface 201 of j$^{th}$ orifice plate 200$j$, and a second opening disposed radially at n$^{th}$ conduit 210$n$ and extending apically from n$^{th}$ conduit 210$n$, wherein the apical opening sized and configured to operably couple to corresponding q$^{th}$ dispensing element's 400$q$, outlet conduit 404. Also illustrated in FIG. 3A, 3B, are nozzles 207$m$, each m$^{th}$ nozzle 207$m$ coupled to the second opening of a$^{th}$ dispensing tube 214$a$, defined in basal surface 202 of j$^{th}$ orifice plate 200$j$. Also illustrated in FIG. 3A, are alignment drills 2111, configured to receive and accommodate rods, operable to align each n$^{th}$ conduit 210$n$, on bored walls 203, 203' with its corresponding n$^{th}$ bore 310$n$ defined in bored side wall 306 of p$^{th}$ circulating manifold 300$p$.

Figure 4A:
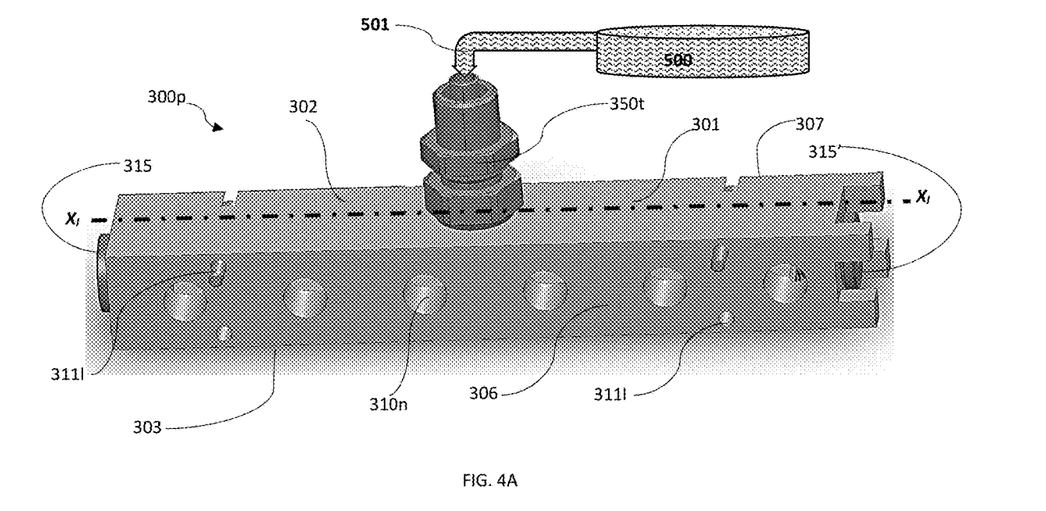
FIG. 4A Illustrates a perspective view of each recirculating manifold of the print head illustrated in FIG. 1, with FIG. 4B illustrating a X-Z cross section of the manifold illustrated in FIG. 4A.
Figure 4B:
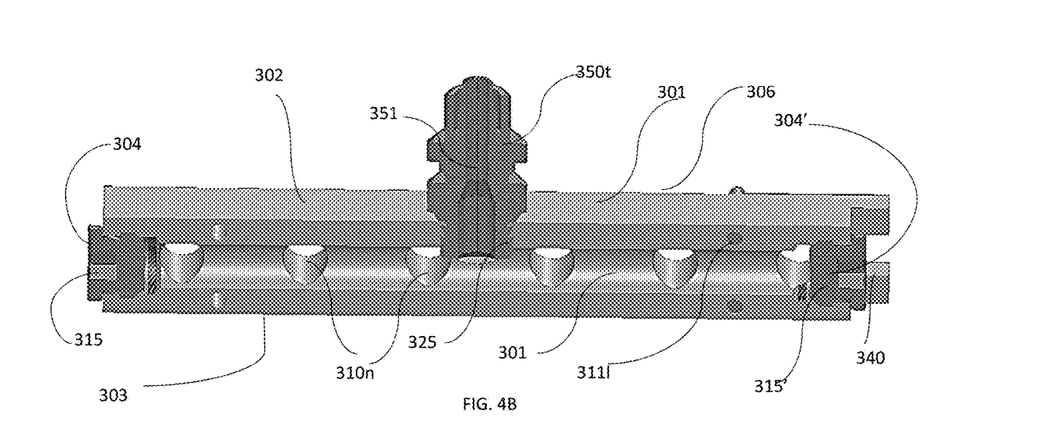

Turning now to FIG. 4A, 4B, illustrating an example configuration of recirculating manifold 300$p$, each p$^{th}$ circulating manifold 300$p$ having apical surface 302, and basal surface 303, p$^{th}$ circulating manifold 300$p$ further defining: central aperture 325 defined in apical surface 302 of p$^{th}$ circulating manifold 300$p$; longitudinal duct 301 spanning the length of p$^{th}$ circulating manifold 300$p$ defining an opening in each of the pair of opposing side walls 304, 304' disposed transverse to longitudinal axis $X_l$; and plurality of bores 310$n$, extending radially from longitudinal duct 301 to bored wall 306, each n$^{th}$ bore 310$n$ sized and configured to align with and maintain fluid communication with a corresponding n$^{th}$ conduit 210$n$, each spanning the width of j$^{th}$ orifice plate 200$j$ between bored walls 203, 203'. FIGS. 4A, 4B, further illustrate inlet/outlet pipe assembly 350$t$, each t$^{th}$ inlet/outlet pipe assembly 350$t$ (for example, NPT compression pie adapter), operably coupled to central aperture 325; and pair of stoppers 315, 315' each coupled to the opening in each of the pair openings defined in opposing side walls 304, 304' of p$^{th}$ circulating manifold 300$p$.

Figures 5A, 5B:
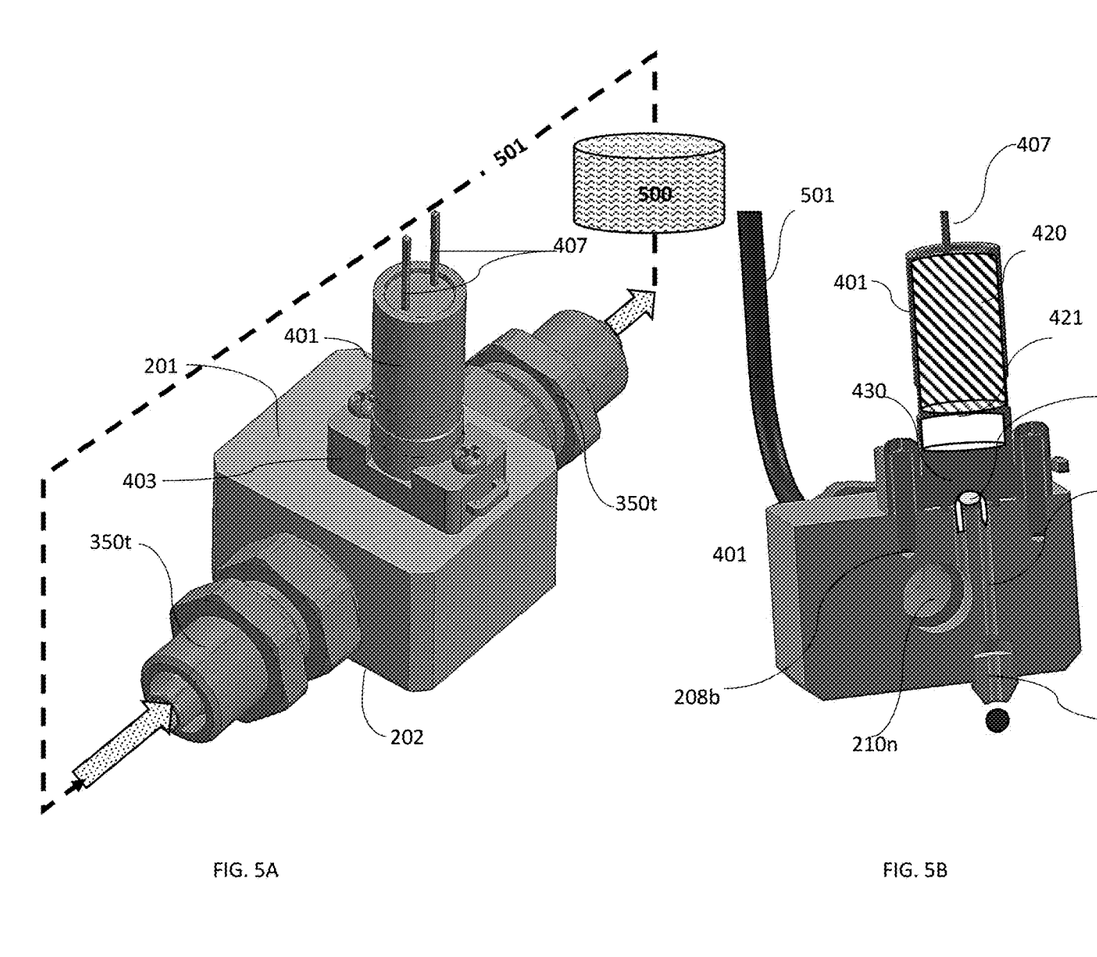
Figure 5C:
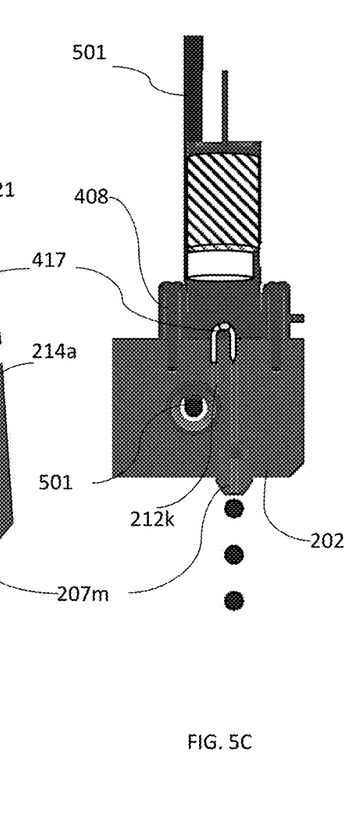
Figure 6:
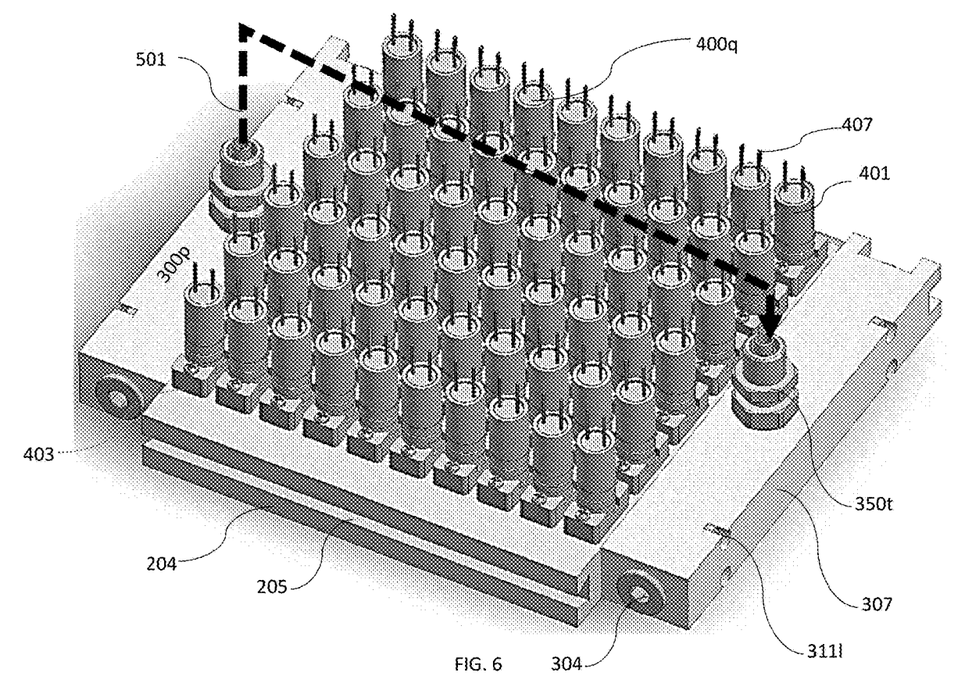
FIG. 6, illustrates a single print head configuration.

Turning now back to FIGS. 2A, 2B, as well as FIGS. 5A-5C, illustrating an exemplary configuration of bio-ink dispensing element's 400$q$, whereby each q$^{th}$ bio-ink dispensing element's 400$q$, comprises: a cylindrical housing 401, a base member 403 having upper surface 409 and lower surface 402, as well as a sealing element 406 (for example, a silicon, viton or the like biocompatible material adapted to maintain a seal between adjacent parts), defining two opening, each opening sized and configured to align and maintain fluid communication with the inlet and outlet conduits 405, 404 (respectively) of q$^{th}$ bio-ink dispensing element's 400$q$; and a pair of leads 407 configured to maintain electric communication with a central processing module (CPM)

(not shown). Also illustrated are pegs 408, 408' configured to reversibly couple each $q^{th}$ bio-ink dispensing element's 400q, with a corresponding drill 208b in each $j^{th}$ orifice plate 200j (see e.g., FIG. 3B). As illustrated in FIG. 2B, as well as FIGS. 5B, and 5C, housing 401 in each $q^{th}$ bio-ink dispensing element's 400q, further comprise in certain implementations: actuator 420 in communication with CPM 700 (not shown); and a dispensing member 421 coupled to actuator 420, dispensing member 421 operable to affect bio ink 501 flow through the inlet 405 and outlet 404 conduits of $q^{th}$ bio-ink dispensing element's 400q. As illustrated in FIG. 2B, at least one of the inlet conduit 405, and the outlet conduit 404 of $q^{th}$ bio-ink dispensing element's 400q, can further comprise check-valve 417 operable to affect unidirectional flow of bio-ink in reservoir 430, defined within base 403 of each $q^{th}$ bio-ink dispensing element's 400q.

In an exemplary configuration, dispensing member 421 can be a piezoelectric element (or a diaphragm, a needle valve, or pinch valve in other examples) and each of the inlet conduit 405, and the outlet conduit 404 has check valve 417 operably coupled thereto, such that upon getting a command from CPM 700 (not shown), bio ink 501 will be drawn from bio ink reservoir 500 (see e.g., FIG. 4A) into inlet/outlet pipe assembly 350t, from there into longitudinal duct 301 spanning the length of $p^{th}$ circulating manifold 300p, whereby it is distributed through each $n^{th}$ bore 310n, to a corresponding $n^{th}$ conduit 210n, and from there, through charging tube 212k, into inlet conduit 405 and to reservoir 430, flowing which dispensing member 421 will expel droplets of between about 0.01 microliter and 10 microliter of bio-ink 501 through nozzle 207m coupled to the second opening of $a^{th}$ dispensing tube 214a, defined in basal surface 202 of $j^{th}$ orifice plate 200j, and onto a biocompatible substrate in a pattern provide and controlled by CPM 700 (not shown). In the context of the disclosure, the term "bio ink" or "bioink" means a liquid, semi-solid, or solid composition comprising a plurality of cells. In some exemplary implementations, bio-ink comprises cell solutions, cell aggregates, cell-comprising gels, multicellular bodies, or tissues. In some exemplary implementations, the bio-ink additionally comprises support material. In some exemplary implementations, the bio-ink additionally comprises non-cellular materials that provide specific biomechanical properties that enable bio-printing.

Throughout bioprinting, it may be desired to maintain laminar flow of the bio-ink through certain components of the print head, while allowing for turbulent flow in others. In the context of the disclosure, "laminar flow" of bio-ink 501 means stable, non-recirculating flow. In other words, there are no zones of recirculation, and turbulence is negligible. In each implementation the pipes, bores tubes and conduits defined in the various elements and components disclosed and claimed herein, are each having dimensions, as is known to the art, allowing such non-turbulent flow under flow rates used. Certain configurations exemplified herein, are designed to be carried out in devices comprising pipes, bores tubes and conduits of a size such that the Reynolds number for flow within the channel is below about 2100, or is below about 10. Reynolds number is the ratio of inertia to apparent viscosity. Alternatively, "laminar flow" means pipes, bores tubes and conduits which allow for laminar flow under hydrodynamic conditions, defined by viscosity and flow speed. For a pipes, bores tubes and conduits of given dimensions, laminar flow can be achieved for a liquid of certain viscosity and flow speed. The dimensions of the pipes, bores tubes and conduits are chosen such that laminar flow is maintained, i.e., low Reynold's number, preferably below about 1. That is, at least one dimension—either the diameter or the flow rate—is sized and configured to maintain a low Reynold's number and hence laminar flow.

Formulating the bio-ink composition(s), may take into account the requirements, if any, imposed by the dispensing print head and the surface characteristics (e.g., hydrophilic or hydrophobic, and the surface energy of and optionally provided substrate, whether the desired flow is laminar or turbulent, differentiation constraints on stem cells, effect of organelles flow orientation/demixing and the like). For example, using dispensing elements with at least one of: a piezo electric dispenser, a needle valve, a diaphragm, and a pinch valve, the dynamic viscosity of either the first bio-ink and/or the second bio-ink (measured at dispensing temperature temperature) can be, for example, between about 3 cP and about 150 cP, or between about 50 cP and about 150 cP, for example, between about 100 cP and about 150 cP. The first bio-ink, can be configured (e.g., formulated) to have a dynamic surface tension (referring to a surface tension when an ink-jet bio-ink droplet is formed at the dispensing printhead aperture) of between about 25 mN/m and about 35 mN/m, for example between about 29 mN/m and about 31 mN/m measured by maximum bubble pressure tensiometry at a surface age of 50 ms and at 23° C. The dynamic surface tension can be formulated to provide a contact angle with the substrate of between about 1 deg. centigrade and about 166 deg. centigrade, for example, between about 20 deg. centigrade and about 130 deg. centigrade, or between about 35 deg. centigrade deg. centigrade and about 90 deg. Likewise, contact angles between layers and between various bio-inks can be formulated to provide either wetting or form discrete drops on the surface as needed.

For example, the bio-ink can comprise one or more of: a composition comprising: endothelial cells, muscle cells, fibroblast cells, mesothelial cells, pericyte cells, monocyte cells, plasma cells, mast cells, adipocyte cells, chondrocyte cells, cells population manipulated from a specific type of cell to another, or cells composition comprising one or more of the foregoing cells; a bio-compatible polymer; and optionally a photoinitiator.

In certain configurations, as illustrated in FIG. 1, two $i^{th}$ print head 100i are sized and configured to be reversibly coupled by inserting the side wall 204 tongue 206 of one $i^{th}$ quadrilateral orifice plate 200j, to the side wall 204' groove 205 of the at least another $i^{th}$ quadrilateral orifice plate 200j, wherein the tongue and groove of the quadrilateral orifice plates' side wall form a dovetail joint, a tongue and groove joint, a mortise joint, a dowel joint, or a joint combination comprising one or more of the foregoing.

Furthermore, the bio-ink in each $i^{th}$ print head 100i, can be the same or different. In other words, while bio-ink 501 in a first $i^{th}$ print head 100i can be, one or more of: a composition comprising: endothelial cells, muscle cells, fibroblast cells, mesothelial cells, pericyte cells, monocyte cells, plasma cells, mast cells, adipocyte cells, chondrocyte cells, cells population manipulated from a specific type of cell to another, or cells composition comprising one or more of the foregoing cells; a bio-compatible polymer; and optionally a photoinitiator, bio-ink 501 circulated and dispensed through the at least one additional $i^{th}$ print head 100i coupled to the first (see e.g., FIG. 1), can be different, for example comprises: an extracellular matrix composition, PEGilated-methacrylate, chitosan, carrageenan, poly(lactic) acid, poly (lactic-co-glycolic acid), their methacrylate conjugates, co-polymers, interpenetrating networks or a composition comprising one or more of the foregoing. In certain examples, the extracellular matrix (ECM) composition in the second bio-ink can comprise a composition configured to accelerate cell adhesion, promote cell colonization, proliferation, or manipulation, retain native growth of the cells, and/or organ and/or tissue. These can be, for example, epidermal growth factor (EGF), basic fibroblast growth factor (bFGF), bone morphogenic protein (BMP), insulin-like growth factor (IGF), glucoseaminoglycan (GAG), Transforming growth factor (TGF) or extracellular matrix compound composition comprising the foregoing.

The term "bioprinting" refers to a process of making specific type or several types of native or manipulated cells configured to form the edible tissue analog by depositing scaffolding (matrix) material mixed with cells and other bio-inks using inkjet printer having drop-on-demand capabilities. Likewise, the term "forming" (and its variants "formed", etc.) refers in an exemplary implementation to pumping, injecting, pouring, releasing, displacing, spotting, circulating, nebulizing, spaying, ink-jetting, jetting, or otherwise placing a fluid or material (e.g., the myocytes-containing bio-ink) in contact with another material (e.g., the scaffold, connective tissue or another myocytes layer) using any suitable inkjet printing method. In an exemplary implementation, "forming" refers to the assembly of the 3D biostructure itself from its underlying 2D layer images, which, in another exemplary implementation are derived from various raster images (e.g., .dcm) and/or vector data models.

Methods utilizing print head $100i$ (see e.g., FIG. 6), for use in the bioprinting or forming the 3D, cell-embedded biostructure (e.g., tissue, organ, tissue scaffold, connective tissue) can dispense (and derivatives thereof; are to be understood to refer to any device or technique that deposits, dispenses, transfers or creates material on a surface in a controlled accretive or additive manner) can deposit the first bio-ink can be configured to provide the bio-ink droplet(s) upon demand, in other words, as a function of various process parameters such as a conveyor speed, desired cells layer thickness, layer type (e.g., certain type of cell or several types of cells, either manipulated (differentiated) or not) and the like.

In an exemplary implementation, the various components of the $i^{th}$ print head $100i$ are bio-compatible with the bio-ink selected. The term "biocompatible" refers to any polymer or material which when in contact with the bio-ink; does not induce adverse effects such as immunological reactions and/or premature differentiation, and/or physical changes (e.g., coagulation, rejections and the like).

The $i^{th}$ print head $100i$ can be used in an exemplary implementation to pattern the bio-ink(s) by expelling droplets of the liquid bio-ink orifice plate $200j$ one-at-a-time, as the $i^{th}$ print head $100i$ (or the substrate) is maneuvered, for example in two (X-Y) (it should be understood that the dispensing print-head can also move in the Z axis) dimensions at a predetermined distance above the substrate or any subsequent layer. The height of the $i^{th}$ print head $100i$ can be changed with the number of layers, maintaining for example a fixed distance. Each droplet can be configured to take a predetermined trajectory to the substrate on command by, for example a pressure impulse, via dispensing member $421$, such as a deformable piezo-crystal in an exemplary implementation, from within chamber $430$ operably coupled to the orifice.

Other functional print heads can be coupled to the modular print head and further comprises a third print head having: at least one aperture, a reservoir for an ionic composition, and a dispenser sized adapted and configured to dispense the ionic composition through the aperture used for functionalizing the first bio-ink and/or functionalizing the second-bio-ink, using the third print head Moreover, the second bio-ink, can further comprise other additives that affect colonization, proliferation, adherence, inhibit apoptosis, or other manipulation of the cells, retain native growth of the cells, and/or organ and/or tissue and other similar functions. Accordingly and in an exemplary implementation, the second bio-ink used in the methods, systems and compositions for use in the direct inkjet bio-printing of a composite biostructure (e.g., tissue, organ, tissue scaffold, connective tissue), can further comprise: cells manipulation triggering compounds, (for example, epidermal growth factor (EGF), basic fibroblast growth factor (bFGF), bone morphogenic protein (BMP), insulin-like growth factor (IGF), glucoseaminoglycan (GAG), Transforming growth factor (TGF) or signaling compound composition comprising the foregoing), as well as therapeutically effective compounds, antimicrobial compounds, immunosuppressing compounds and the like.

As may also be used herein, the terms "central processing module" (CPM), "module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions (in other words, firmware). CPM ($700$), processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory, random access memory, volatile memory, non-volatile memory, static memory, dynamic memory, flash memory, cache memory, and/or any device that stores digital information.

As used herein, the term "processor" is defined as including, but not necessarily being limited to, an instruction execution system such as a computer/processor-based system, an Application Specific Integrated Circuit (ASIC), a computing device, or a hardware and/or sof $j^{th}$ ware system that can fetch or obtain the logic from a non-transitory storage medium or a non-transitory computer-readable storage medium and execute the instructions contained therein. "Processor" can also include any controller, state-machine, microprocessor, cloud-based utility, service or feature, or any other analogue, digital and/or mechanical implementation thereof. In addition, the computer program (sof $j^{th}$ ware and/or firmware), can comprise program code means for carrying out the steps to facilitate the bioprinting and control the print head and any of its components, for example, dispensing elements $400q$ described herein, as well as a computer program product comprising program code means stored on a medium that can be read by a computer, such as a hard disk, SATA CD-ROM, DVD, USB memory stick, or a storage medium that can be accessed via a data network, such as the Internet or Intranet, when the computer program product is loaded in the main memory of a computer and is carried out by the computer. Thus, the terms "non-transitory storage medium" and non-transitory computer-readable storage medium" are defined as including, but not necessarily being limited to, any media that can contain, store, or maintain programs, information, and data. Non-transitory storage medium and non-transitory computer-readable storage medium may include any one of many physical media such as, for example, electronic, magnetic, optical, electromagnetic, or semiconductor media.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives.

All ranges disclosed herein are inclusive of the endpoints, and the endpoints are independently combinable with each other. "Combination" is inclusive of blends, mixtures, alloys, reaction products, and the like. The terms "a", "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the cell(s) includes one or more cells). Reference throughout the specification to "one exemplary implementation", "another exemplary implementation", "an exemplary implementation", and its derivatives (implementation, configuration, examples, circumstances etc.) and so forth, when present, means that a particular element (e.g., feature, structure, and/or characteristic) described is included in at least one configuration described herein, and may or may not be present in other implementations. In addition, it is to be understood that the described elements may be combined in any suitable manner in the various examples, brought to provide clarifying examples.

All ranges disclosed herein are inclusive of the endpoints, and the endpoints are independently combinable with each other. Furthermore, the terms "first," "second," and the like, herein do not denote any order, quantity, or importance, but rather are used to denote one element from another.

Likewise, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. For example, "about" as used herein mean a reasonable amount of deviation of the modified term such that the end result is not significantly changed. These terms of degree should be construed as including a deviation of at least ±5% or at least ±10% of the modified term if this deviation would not negate the meaning of the word it modifies.

Accordingly and in an exemplary implementation, provided herein is a modular (in bioprinter print head comprising: a quadrilateral orifice plate, having an apical surface, a basal surface, a pair of opposing bored side walls, and a first side wall defining a groove opposing a second side wall defining a groove; a plurality of bio ink dispensing elements arranged in an array, each dispensing element having a basal surface with an inlet conduit and an outlet conduit, the basal surface of the dispensing element abutting the apical surface of the orifice plate, wherein dispensing element operable to deliver the bio ink; a first bio ink circulating manifold, and a second bio ink circulating manifold each defining a longitudinal axis $X_l$, having a bored side wall parallel with the longitudinal axis Xl, and an opposing solid wall, and a pair of opposing side walls disposed transverse to the longitudinal axis, each first and second recirculating manifold maintaining further fluid communication with each dispensing element, wherein the first and second circulating manifold are configured to circulate the bio ink through each dispensing element and further being in fluid communication with a bio ink reservoir, wherein (i) wherein the quadrilateral orifice plate further defines: a plurality of conduits spanning the width of the plate between the bored side walls, the conduits sized and configured to maintain liquid communication with the first and second bio ink circulating manifold; a plurality of parallel tube pairs comprising a dispensing tube and an adjacent charging tube wherein each dispensing tube having a first opening at the apical surface of the orifice plate and a second opening at the basal surface of the orifice plate, the apical opening sized and configured to operably couple to the dispensing element's outlet conduit; and each charging tube having a first opening at the apical surface and a second opening disposed radially at a conduit and extending apically from the conduit, wherein the apical opening sized and configured to operably couple to the dispensing element's outlet conduit; and a nozzle coupled to the second opening of the dispensing tube defined in the basal surface of the orifice plate, (ii) the first and second bio ink recirculating manifold, each having an apical surface, and a basal surface the first and second recirculating manifold, each further defining: a central aperture disposed on the apical surface of the first and second recirculating manifold; a longitudinal duct spanning the length of the manifold defining an opening in each of the pair of opposing side walls disposed transverse to the longitudinal axis; and a plurality of bores extending radially from the central duct to bored wall, each bore sized and configured to align with and maintain fluid communication (in other word being operable to maintain controlled liquid/ gas or their combination in flow between the source and target of the liquid or gas flowing) with a corresponding conduits spanning the width of the plate between the bored side walls, the print head(s) further comprising (iii) an inlet pipe assembly operably coupled to the central aperture; and a pair of stoppers each coupled to the opening in each of the pair of opposing side, wherein (iv) each bio ink dispensing element comprises: a cylindrical housing a base having an upper surface and a lower surface; a sealing element defining two opening, each opening sized and configured to align and maintain fluid communication with the inlet and outlet conduit of the dispensing element; and a pair of leads configured to maintain electric communication with a central processing module (CPM), (v) the cylindrical housing in each bio ink dispensing element further comprises: an actuator in communication with the CPM; and a dispensing member coupled to the actuator, the dispensing member operable to affect bio ink flow through the inlet and outlet conduit of the dispensing element, wherein (vi) at least one of the inlet conduit, and the outlet conduit of the dispensing element further comprises a check-valve operable to affect unidirectional flow of the bio-ink in a chamber defined within the base, wherein (vii) the bio ink is configured to have a laminar flow throughout the print head, (viii) each dispensing element is operable to dispense a plurality of droplets, each having a volume of between about 0.01 microliter, and about 10 microliter, wherein (ix) the bio-ink comprises one or more of: a composition comprising: endothelial cells, muscle cells, fibroblast cells, mesothelial cells, pericyte cells, monocyte cells, plasma cells, mast cells, adipocyte cells, chondrocyte cells, cells population manipulated from a specific type of cell to another, or cells composition comprising one or more of the foregoing cells; a bio-compatible polymer; and optionally a photoinitiator, whereby (x) at least two of the print heads, reversibly (in other words, operable for easy and fast placement or on the contrary removal) coupled by inserting the side wall tongue of one quadrilateral orifice plate, to the side wall groove of the at least another quadrilateral orifice plate, (xi) the tongue and groove of the quadrilateral orifice plates' side wall form a dovetail joint, a tongue and groove joint, a mortise joint, a dowel joint, or a joint combination comprising one or more of the foregoing, such that (xii) the bio ink in one print head is the same or different than the bio ink in the at least second print head (in other words, in cases with three or four print heads, the bio ink can be the same or different composition in any permutation), wherein (xiii) the bio ink in the at least second print head comprises: an extracellular matrix composition, PEGilated-methacrylate, chitosan, carrageenan, poly(lactic) acid, poly(lactic-co-glycolic acid), their methacrylate conjugates, co-polymers, interpenetrating networks or a composition comprising one or more of the foregoing, and wherein (xiv) the extracellular matrix composition in the second bio-ink comprises a composition configured to accelerate cell adhesion, promote cell colonization, proliferation, or manipulation, retain native growth of the cells, and/or organ and/or tissue.

Although the foregoing disclosure for print head assembly been described in terms of some exemplary configurations, other configurations will be apparent to those of ordinary skill in the art from the disclosure herein. Indeed, the novel systems, devices, and assemblies described herein may be embodied in a variety of other forms without departing from the spirit thereof. Accordingly, other combinations, omissions, substitutions and modifications will be apparent to the skilled artisan in view of the disclosure herein.

What is claimed:

1. A modular bioprinter print head comprising:
   a. a quadrilateral orifice plate, having an apical surface, a basal surface, a pair of opposing bored side walls, and a first side wall defining a groove forming a side wall groove opposing a second side wall defining a tongue, forming a side wall tongue;
   b. a plurality of bio ink dispensing elements arranged in an array, each dispensing element having a basal surface with an inlet conduit and an outlet conduit, the basal surface of the dispensing element abutting the apical surface of the orifice plate, wherein dispensing element operable to deliver the bio ink;
   c. a first bio ink circulating manifold, and a second bio ink circulating manifold each defining a longitudinal axis $X_l$, having a bored side wall parallel with the longitudinal axis Xl, and an opposing solid wall, and a pair of opposing side walls disposed transverse to the longitudinal axis, each first and second bio ink recirculating manifold maintaining further fluid communication with each dispensing element, wherein the first and second bio link circulating manifold are configured to circulate the bio ink through each dispensing element and further being in fluid communication with a bio ink reservoir.

2. The print head of claim 1, wherein the quadrilateral orifice plate further defines:
   a. a plurality of conduits spanning the width of the plate between the bored side walls, the conduits sized and configured to maintain liquid communication with the first and second bio ink circulating manifold;
   b. a plurality of parallel tube pairs comprising a dispensing tube and an adjacent charging tube wherein
      i. each dispensing tube having a first opening at the apical surface of the orifice plate and a second opening at the basal surface of the orifice plate, the apical opening sized and configured to operably couple to the dispensing element's outlet conduit; and
      ii. each charging tube having a first opening at the apical surface and a second opening disposed radially at a conduit and extending apically from the conduit, wherein the apical opening sized and configured to operably couple to the dispensing element's outlet conduit; and
   c. a nozzle coupled to the second opening of the dispensing tube defined in the basal surface of the orifice plate.

3. The print head of claim 2, wherein the first and second bio ink recirculating manifold, each having an apical surface, and a basal surface the first and second bio link recirculating manifold, each further defining:
   a. a central aperture disposed on the apical surface of the first and second recirculating manifold;
   b. a longitudinal duct spanning the length of the manifold defining an opening in each of the pair of opposing side walls disposed transverse to the longitudinal axis; and
   c. a plurality of bores extending radially from the longitudinal duct to bored wall, each bore sized and configured to align, and maintain fluid communication with a corresponding conduits spanning the width of the plate between the bored side walls.

4. The print head of claim 3, comprising:
   a. an inlet pipe assembly operably coupled to the central aperture; and
   b. a pair of stoppers each coupled to the opening in each of the pair of opposing side.

5. The print head of claim 4, wherein each bio ink dispensing element comprises:
   a. a cylindrical housing
   b. a base having an upper surface and a lower surface;
   c. a sealing element defining two opening, each opening sized and configured to align and maintain fluid communication with the inlet and outlet conduit of the dispensing element; and
   d. a pair of leads configured to maintain electric communication with a central processing module (CPM).

6. The print head of claim 5, wherein the cylindrical housing in each bio ink dispensing element further comprises: an actuator in communication with the CPM; and a dispensing member coupled to the actuator, the dispensing member operable to affect bio ink flow through the inlet and outlet conduit of the dispensing element.

7. The print head of claim 6, wherein at least one of the inlet conduit, and the outlet conduit of the dispensing element further comprises a check-valve operable to affect unidirectional flow of the bio-ink in a chamber defined within the base.

8. The print head of claim 1, wherein the bio ink is configured to have a laminar flow throughout the print head.

9. The print head of claim 1, wherein each dispensing element is operable to dispense a plurality of droplets, each having a volume of between about 0.01 microliter, and about 10 microliter.

10. The print head of claim 1, wherein the bio-ink comprises one or more of:
    a. a composition comprising: endothelial cells, muscle cells, fibroblast cells, mesothelial cells, pericyte cells, monocyte cells, plasma cells, mast cells, adipocyte cells, chondrocyte cells, cells population manipulated from a specific type of cell to another, or cells composition comprising one or more of the foregoing cells;
b. a bio-compatible polymer; and
c. optionally a photoinitiator.

11. At least two of the print head of claim 1, reversibly coupled by inserting the side wall tongue of one quadrilateral orifice plate, to the side wall groove of the at least another quadrilateral orifice plate.

12. The at least two print heads of claim 10, wherein the side wall tongue and the side wall groove of the quadrilateral orifice plates' side wall form; a dovetail joint, a tongue and groove joint, a mortise joint, a dowel joint, or a joint combination comprising one or more of the foregoing.

13. The at least two print heads of claim 12, wherein the bio ink in one print head is the same or different than the bio ink in the at least second print head.

14. The at least two print heads of claim 13, wherein the bio ink in the at least second print head comprises: an extracellular matrix composition, PEGilated-methacrylate, chitosan, carrageenan, poly(lactic) acid, poly(lactic-co-glycolic acid), their methacrylate conjugates, co-polymers, interpenetrating networks or a composition comprising one or more of the foregoing.

15. The at least two print heads of claim 14, wherein the extracellular matrix composition in the second bio-ink comprises a composition configured to accelerate cell adhesion, promote cell colonization, proliferation, or manipulation, retain native growth of the cells, and/or organ and/or tissue.

* * * * *